United States Patent [19]
Schick et al.

[11] Patent Number: 4,691,072
[45] Date of Patent: Sep. 1, 1987

[54] POLYMERIZATION OF ISOBUTYLENE

[75] Inventors: Hans Schick, Mannheim; Erich Kolk, Bad Durkheim; Karl-Heinz Fauth, Wattenheim; Heinrich Mohr, Frankenthal, all of Fed. Rep. of Germany

[73] Assignee: BASF Aktiengesellschaft, Ludwigshafen, Fed. Rep. of Germany

[21] Appl. No.: 887,938

[22] Filed: Jul. 22, 1986

[30] Foreign Application Priority Data

Aug. 1, 1985 [DE] Fed. Rep. of Germany ....... 3527551

[51] Int. Cl.$^4$ ................................................. C07C 2/08
[52] U.S. Cl. ..................................... 585/525; 526/327; 585/510; 585/520
[58] Field of Search ................ 585/525; 526/237, 520, 526/510

[56] References Cited

U.S. PATENT DOCUMENTS

| | | | |
|---|---|---|---|
| 2,637,720 | 5/1955 | Schneider | 526/237 |
| 2,775,577 | 12/1956 | Schneider | 526/237 |
| 2,906,798 | 9/1959 | Starnes et al. | 260/683.65 |
| 2,918,508 | 12/1959 | Coopersmith et al. | 526/237 |
| 3,129,205 | 4/1964 | Rowe et al. | 260/85.3 |
| 4,391,959 | 7/1983 | Fauth et al. | 526/70 |
| 4,605,808 | 8/1986 | Samson | 585/525 |

Primary Examiner—Asok Pal
Attorney, Agent, or Firm—Keil & Weinkauf

[57] ABSTRACT

The conversion is increased in the preparation of polyisobutylene by polymerization of isobutylene in a polymerization zone at from 0° to −130° C. in the presence of from 0.01 to 1.0% by weight of a boron trifluoride catalyst, from 0.001 to 1.0% by weight of a molecular weight regulator and from 30 to 90% by weight of a low-boiling solvent which is inert under the reaction conditions, by a process in which the content of but-1-ene in the monomeric isobutylene is kept constant at from 1.9 to 2.1, in particular 2.0, % by weight.

2 Claims, No Drawings

POLYMERIZATION OF ISOBUTYLENE

The present invention relates to a process for increasing the conversion in the preparation of polyisobutylene by polymerization of isobutylene in a polymerization zone in which the temperature is maintained at from 0° to −130° C., in the presence of from 0.01 to 1.0% by weight of a boron trifluoride catalyst which contains less than 0.3% by volume of foreign components, from 0.001 to 1.0% by weight of a molecular weight regulator and from 30 to 90% by weight of a low-boiling solvent which is inert under the reaction conditions, the percentages by weight in each case being based on the isobutylene employed, and, if required, a conventional amount of a polymerization accelerator, the solvent vaporized during the polymerization being removed continuously, liquefied and recycled in the liquid state to the polymerization zone.

Polymerization processes of this type have to be carred out in the presence of catalysts and molecular weight regulators and in the presence or absence of polymerization accelerators, the latter being intended not only ot increase the molecular weight of the resulting polymer but also to accelerate the reaction and reduce the amount of catalyst required. Furthermore, it is important industrially to carry out the polymerization of isobutylene at fixed low temperatures, at which crosslinking reactions and side reactions do not take place, and at the same time to remove the heat of polymerization of the isobutylene.

It is known that the polymerization of isobutylene or isobutene at from 0° to −130° C. can be catalyzed with a Friedel-Crafts compound in the presence of a molecular weight regulator, that the reaction can be accelerated by carrying out the procedure in the presence of from 10 to 5000 ppm by weight, based on the isobutylene, of a polymerization accelerator, and that the heat of reaction can be removed by effecting polymerization in the presence of a low-boiling inert solvent which vaporizes under thr reaction conditions (cf. U.S. Pat. Nos. 3,129,205, 2,906,798 and 4,391,959, EP-No. A1-154164, German Pat. No. 1,099,171 and EP-No. B1-25530). In the known processes, the vaporized solvent is compressed in a compressor and recycled to the polymerization process.

We have found that impurities in the isobutylene can seriously interfere with the course of polymerization. Because of the physical data (bp. 760 mm: −6.9° C.; mp.: −140° C.) and the preparation conditions, isobutylene contains a large number of impurities ranging from $C_2$ to $C_7$ hydrocarbons. Particularly among the $C_4$ hydrocarbons, there is a fairly large number of polymerization-active components, which have to be separated off by means fo careful distillation under superatmospheric pressure.

Whereas $C_4$ hydrocarbon fractions which contain not only isobutylene but also n-butan, isobutane and n-butenes can be used for the preparation of low molecular weight polyisobutylenes, the isobutylene used for the preparation of high molecular weight and solid polyisobutylenes has to meet higher requirements. The isobutylene obtained from the cleavage of isobutanol, and contaminated with n-butenes, isobutyraldehyde and isobutyl ether and having a purity of about 88–99.8% by volume, is subjected to careful distillation in this case. Although fractional distillation gives a high grade isobutylene, the latter still contains a number of troublesome components which are difficult to separate off (buta-1,3-diene, propene, isobutane and but-1-ene). The concentration of the individual troublesome components is dependent on the result of the cleavage reaction and therefore cannot be specified of defined from the outset.

Isolation if isobutylene from $C_4$ hydrocarbon cuts by etherification with methanol (MTBE) or isobutanol (IBTBE) followed by cleavage of the particular ether gives a isobutylene which has a purity of 99–99.98% by volume and is virtually free of the above-mentioned troublesome components. While the components which present problems in the isobutylene polymerization are present in the isobutylene from the cleavage reaction in a concentration of 0.2–12% by volume, this concentration is restricted to <2000 ppm by volume in the case of isobutylene.

We have found that when either isobutylene from the cleavage reaction or budimat isobutylene is used, the circulated solvent, after a short time, becomes so highly enriched in foreign substances which interfere with the action of the regulator and increase the polymerization time and catalyst consumption, that the circulating gas lines become coated with low molecular weight to medium molecular weight polyisobutylenes and hence prevent continuous operation.

It is an object of the present invention to provide a process which avoids the abovementioned disadvantages and permits the conversion to be increased.

Processes for the preparation of polyisobutylene by polymerization of isobutylene in a polymerization zone have long been known and are described in detail in the monograph by H. Güterbock, Chemische Technologie der Kunststoffe in Einzeldarstellungen, Polyisobutylen, 1959, pages 77 to 105, Springer-Verlag, Berlin/Göttingen Heidelberg. The polyisobutylenes obtained range from viscous and oily to elastomeric at room temperature, depending on the molecular weight, have a density of from 0.83 to 0.93 g/cm$^3$ and are of the formula:

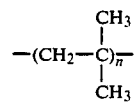

where n is from 2 to 80,000.

In the conventional process, isobutylene is polymerized at from 0° to −160° C., preferably from −50° to −110° C., under atmospheric pressure.

The known process primarily employs boron trifluoride as the Friedel-Crafts catalyst, in conventional amounts of from 0.01 to 1.0% by weight, based on the isobutylene employed. In order to be able to obtain a polyisobutylene having a specific molecular weight at a given temperature, molecular weight regulators may be used, in conventional amounts of from 1 to 5000 ppm by weight, based on the isobutylene used. Examples of such molecular weight regulators are diisobutylene, mercaptans, sulfides and polysulfides. In addition to reducing the molecular weight of the isobutylene polymers formed, the molecular weight regulators substantially increase the reaction time and frequently also increase the amount of catalyst required.

The polymerization of isobutylene is carried out in the presence of from 10 to 5000 ppm by weight, based on the isobutylene used, of a polymerization accelerator. These substances accelerate the reaction and reduce the amount of catalyst required. As a result of these additives, high molecular weight polyisobutylenes are also formed, since chain-terminating influences become less effective. These compounds are preferably primary or secondary alcohols of 1 to 10 carbon atoms, e.g. methanol, ethanol, n-propanol, isopropanol, n-butanol, isobutanol, amyl alcohols, cyclohexanol and benzyl alcohol. Other suitable compounds are phenols, carboxylic acids and mineral acids.

The polymerization of the isobutylene is carried out in the presence of from 30 to 90% by weight, based on the isobutylene used, of a low-boiling solvent which is inert under the reaction conditions. Because of the advantageous level of their boiling points, preferred solvnets are methane, ethane, propane and in particular ethylene, since the heat of polymerization of the isobutylene can be removed in a simple manner by evaporation of these solvents under the reaction conditions. When the abovementioned solvents, which at the same time are coolants, are used, for example when ethylene is employed, the isobutylene is polymerized at the boiling point of the inert solvent. In the case of ethylene, the polymerization remperature is $-104$ C.

In conventional processes, the solvent vaporized during the polymerization is removed continuously, liquefied, and recycled in the liquid state to the polymerization zone.

In the process according to the invention, a constant content of from 1.9 to 2.1, preferably 2.0, % by weight of but-1-ene is maintained in the monomeric isobutylene used for polymerization. But-1-ene is available commercially in high purity (99.3% by weight of but-1-ene, 0.2% by weight of isobutene and 0.4% by weight of butane), and is used in this form. In a preferred procedure, the total amount of cis-but-2-ene and transbut-2-ene in the but1-ene should be less than 50 ppm by weight. The cis and trans isomers of but-2-ene must be separated off carefully by distillation under superatmospheric pressure, and drying with calcium chloride must be carried out. The but-1-ene can be added volumetrically to the isobutylene. If, owing to the preparation conditions, a certain concentration of but-1-ene is already present, the content of but-1-ene must be brought to 1.9–2.1, preferably 2.0, % by weight either by adding but-1-ene or by adding very pure isobutene.

The particular advantage of the invention is that, by keeping the content of pure but-1-ene in the isobutylene constant at about 2 % by weight, the polymerization characteristics of the isobutylene are improved, e.g. the conversion is increased, polymerization takes place smoothly and the catalyst concentration and regulator concentration are reduced.

The Examples which follow illustrate the process according to the invention. The molecular weights stated in the Examples were determined from viscosity measurements on dilute polymer solutions, by the Staudinger method. To illustrate the prior art, an isobutylene from the cleavage reaction, having a variable but-1-ene content, and a budimat isobutylene containing 0.05% by weight of but-1-ene were used.

The experiments described below were carried out for the preparation of isobutylene:

It is known that water can be eliminated from primary, secondary and tertiary alcohols by passing the alcohol vapor over a catalyst at from 330° to 450° C., and olefins prepared in this way. The catalysts used are β-aluminas (cf. Houben-Weyl, Methoden der organischen Chemie, Vol. IV, part 2, page 210 ). The dehydration products are summarized in the Table below and have different but-1-ene contents, depending on the starting material and the catalyst.

| Experiment | Starting Material | Catalyst | Dehydration products, in % by weight | | | |
|---|---|---|---|---|---|---|
| | | | Isobutylene | But-1-ene | cis-, trans-but-2-ene | Foreign gas |
| | n-butanol | $\gamma$-Al$_2$O$_3$ from boehmite | 5 | 58 | 35 | 2 |
| 1 | isobutanol | | 89.7 | 3.2 | 6.4 | 0.7 |
| | tert-butanol | | — | — | — | — |
| | n-butanol | $\gamma$-Al$_2$O$_3$ from bayerite | 2 | 83 | 14 | 1 |
| 2 | isobutanol | | 96.2 | 1.4 | 2.0 | 0.4 |
| 3 | tert-butanol | | 98.5 | 0.5 | 0.9 | 0.1 |
| | n-butanol | $\gamma$-plus n-Al$_2$O$_3$ | 5 | 82 | 13 | 1 |
| | isobutanol | | 97.0 | 1.2 | 1.5 | 0.3 |
| 4 | tert-butanol | | 99.8 | <0.1 | <0.05 | Remainder |

The procedure was carried out at about 310° C. in each case.

The isobutylenes obtained in experiments 1, 2, 3 and 4 are investigated as follows:

(A) Polymerization Solution 12 g of pure, dry liquid isobutylene according to experiment 1 (or 2, 3 or 4) are mixed, at $-7°$ C. in the absence of moisture, with 1000 ppm by weight, based on the isobutylene empolyed, of isobutanol and 23 g of pure, dry liquid ethene at $-104°$ C.

(B) Catalyst Solution 100 mg of boron trifluoride having a purity of greater than 99.7% by volume are dissolved in 23 g of pure, dry liquid ethene at $-104°$ C. The catalyst solution is added to the polymerization solution. The reaction proceeds with boiling and vaporization of the ethene, and is complete after the reaction times stated in the Table.

| But-1-ene content, % by weight | Reaction time in s | Molecular weight $\times$ 1000 | Conversion in % |
|---|---|---|---|
| 3.2 (Experiment 1) | 15 | 265 | 92.5 |
| 1.4 (Experiment 2) | 14 | 277 | 97.6 |
| 0.5 (Experiment 3) | 11 | 275 | 97.5 |
| <0.1 (Experiment 4) | 10 | 274 | 97.4 |

EXAMPLE AND COMPARATIVE EXAMPLES

But-1-ene is added to the isobutylene from Experiment 4 in the concentrations stated in the Table, and the mixtures are investigated as described above. The but-1-ene has a purity of 99.7% by weight and contains 0.2% by weight of butane (n- and isobutane), and 50 ppm by weight of cis- and trans-but-2-ene together, the remainder being isobutylene.

| But-1-ene, % by weight | Incubation time in s | Reaction time in s | Molecular weight × 1000 | Standard deviation ± s × 1000 | Conversion in % by weight, based on isobutylene |
| --- | --- | --- | --- | --- | --- |
| <0.1 | 0.5 | 10 | 274 | 20 | 97.4 |
| 0.5 | 1.0 | 11 | 275 | 15 | 97.5 |
| 1.0 | 1.0 | 12 | 276 | 10 | 97.5 |
| 1.5 | 1.5 | 14 | 280 | 5 | 97.7 |
| *2.0 | 2 | 16 | 286 | | 98.9 |
| 2.5 | 2 | 22 | 268 | 10 | 92.6 |
| 5 | 2 | 28 | 220 | 20 | 87.8 |

*Invention

The most optimum mixture comprises 98% by weight of very pure isobutylene (99.99% by weight of isobutylene, <100 ppm by weight of butane and <50 ppm by weight of cis- and trans-but-2-ene) and 2% by weight of n-but-1-ene.

While the dehydration of isobutanol gives isobutylenes of variable but--ene content, depending on the process conditions, the dehydration of tert-butyl alcohol results in a very pure isobutylene (purity 99.99% by weight) containing very little but-1-ene. But-1-ene cannot be separated from isobutylene by distillation, since the boiliing points are too close together (bp. of isobutylene −6.9° C.; bp. of but-1-ene −6.26° C.). However, for trouble-free polymerization of isobutylene to obtain high molecular weight polyisobutylenes, and isobutylene having a constant but-1-ene content of from 1.9 to 2.1, in particular 2.0, % by weight is required.

We claim

1. A process for increasing the conversion of isobutylene in the preparation of polyisobutylene by polymerization of isobutylene in a polymerization zone in which the temperature is maintained at from 0° to −130° C., in the presence of from 0.01 to 1.0% by weight of a boron trifluoride catalyst which contains less than 0.3% by volume of foreign components, from 0.001 to 1.0% by weight of a molecular weight regulator and from 30 to 90% by weight of a low-boiling solvent which is inert under the reaction conditions, the percentages by weight in each case being based on the isobutylene employed, and, from 10 to 5000 ppm by weight of a polymerization accelerator, the solvent vaporized during the polymerization being removed continuously, liquefied and recycled in the liquid state to the polymerization zone, wherein the content of but-1-ene in the monomeric isobutylene is kept constant at from 1.9 to 2.1% by weight, base on the isobutylene and the but-1-ene contains less than 50 ppm by weight of cis-but-2-ene and trans-but-2-ene together.

2. A process as claimed in claim 1, wherein a but-1-ene content of 2.0% by weight is maintained.

* * * * *